R. W. FUNK.
TOOL FOR OPERATING VEHICLE WHEEL RIMS.
APPLICATION FILED OCT. 6, 1911. RENEWED OCT. 25, 1917.

1,319,860. Patented Oct. 28, 1919.

UNITED STATES PATENT OFFICE.

RICHARD W. FUNK, OF WEEHAWKEN, NEW JERSEY, ASSIGNOR, BY MESNE ASSIGNMENTS, TO UNIVERSAL RIM COMPANY, OF CHICAGO, ILLINOIS, A CORPORATION OF ILLINOIS.

TOOL FOR OPERATING VEHICLE-WHEEL RIMS.

1,319,860. Specification of Letters Patent. Patented Oct. 28, 1919.

Application filed October 6, 1911, Serial No. 653,200. Renewed October 25, 1917. Serial No. 198,544.

*To all whom it may concern:*

Be it known that I, RICHARD W. FUNK, a citizen of the United States, residing in Weehawken, county of Hudson, and State of New Jersey, have invented certain new and useful Improvements in Tools for Operating Vehicle-Wheel Rims, of which the following is a specification.

My invention relates to an improved tool for operating a transversely split demountable tire-carrying rim for vehicle wheels. In certain vehicle wheel rim structures a demountable tire-carrying rim is used which is transversely split in order to permit the same to be collapsed, when demounted from the wheel, to more readily permit the application and removal of the tire. With such structures it has sometimes been difficult to effect the collapsing or contraction of the rim, and also to maintain the same contracted while the tire is removed. By my invention a tool is provided by which the rim may be easily manipulated, the tool coöperating with the rim in such manner that the rim is automatically held in contracted position.

Figure 1:
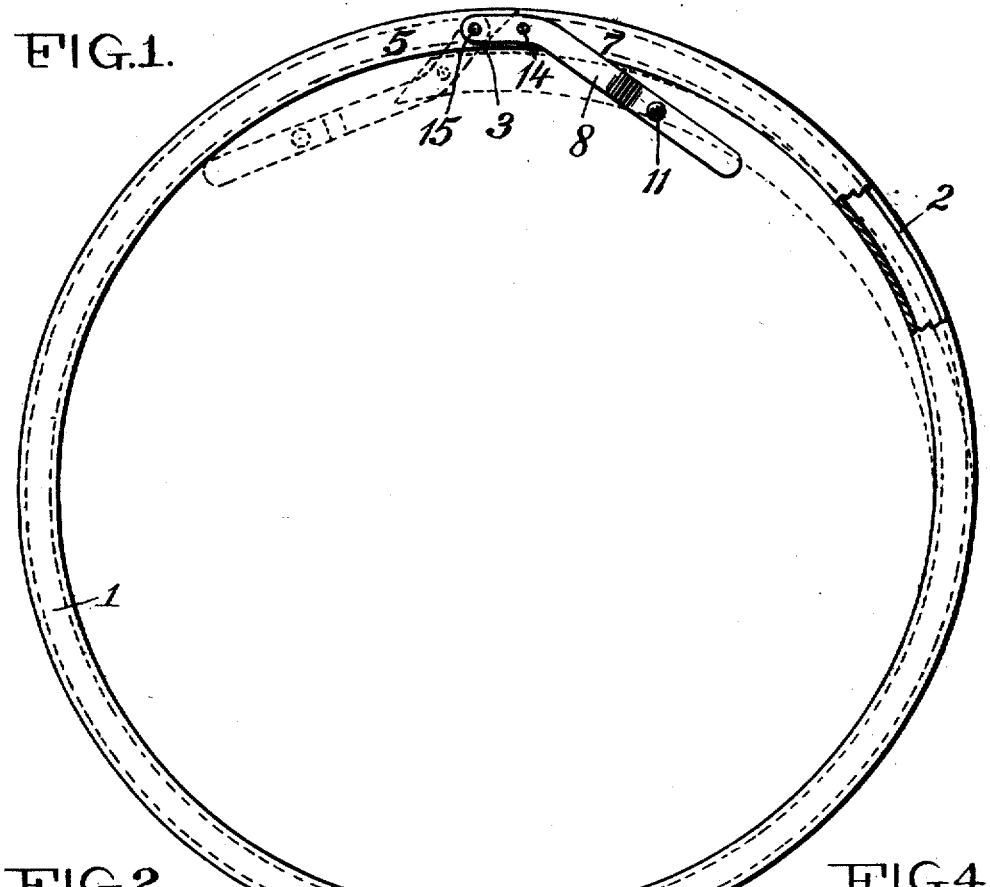
Figure 2:
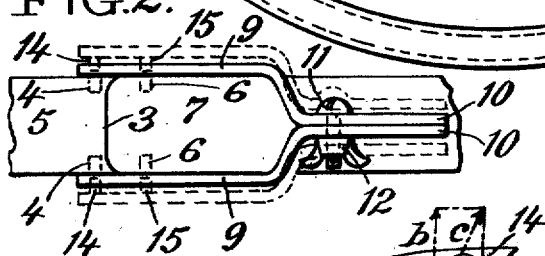
Figure 3:
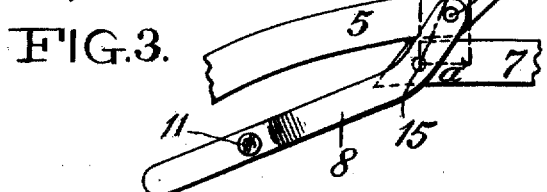
Figure 4:
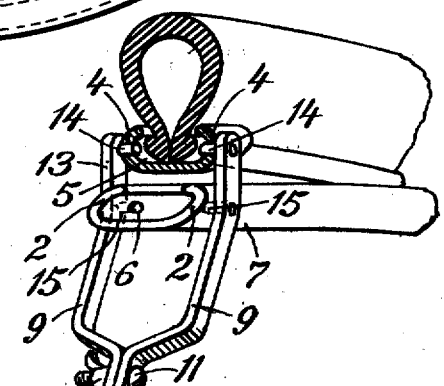

In the accompanying drawings which form a part of this specification, Figure 1 is a side elevation of a tire-carrying rim with the tool applied thereto, illustrating a preferred embodiment of my invention. A portion of one of the rim flanges is illustrated as broken away. Fig. 2 is a plan view of the inside of a portion of the rim with the tool applied thereto, the dotted lines indicating the positions of the members of the tool when being applied to the rim; Fig. 3 is a side elevation of a portion of a rim and tool showing the ends of the rim in overlapped position; Fig. 4 is a perspective view showing the ends of the rim overlapped with the tool applied thereto, one part of the rim and the tire being shown in transverse section.

Referring to the drawings in detail, the numeral 1 designates the rim, which is provided with the tire-retaining flanges 2. The rim is transversely split at the point 3, preferably on a plane oblique to a radius, as shown. Means are provided in or upon the rim at each side of the split therein for engagement by the tool. As shown, these means consist of holes or sockets 4 in the end 5 of the rim and holes or sockets 6 in the end 7 of the rim, the axes of these holes being parallel to elements of the tire seating surface of the rim, and the holes preferably passing entirely through the retaining flanges 2. The tool 8 comprises the two arms of members 9, the ends 10 of which are brought together to form a handle and detachably united in any suitable manner, as by means of the bolt 11 and wing nut 12. The other ends 13 of the arms 9 are bent slightly from the line of the tool and carry two sets of pins 14 and 15 for engagement, respectively with the holes or sockets 4 and the holes or sockets 6.

The tool and rim are operated as follows: The wing nut 12 being loosened, the two arms 9 of the tool are separated sufficiently, as shown in dotted lines in Fig. 2, to permit the tool to be applied to the rim. The pins 14 and 15 are then inserted in their respective sockets and the arms of the tool clamped together by screwing up the wing nut. The rim with the tool applied thereto is then in the position shown in full lines in Fig. 1. The operator then grasps the handle of the tool and forces the same into the position shown in dotted lines in Fig. 1, or in full lines in Fig. 3. This draws the end 7 of the rim inwardly and causes the two ends of the rim to lap, as shown in Fig. 3. The rim is then collapsed sufficiently to permit the tire to be readily placed thereon, or, if the rim already carries a tire, to permit the same to be removed. The parts are preferably so proportioned that when the tool is moved to the position shown in Fig. 3 it will automatically lock itself and retain the rim in collapsed position. This is accomplished by moving the pins 15 beyond the dead-center, so to speak; for example, referring to the diagram in Fig. 3, if the arrow *a* represents the force, due to the elasticity of the rim, tending to move the end of the rim, 7, circumferentially with reference to the end 5 of the rim, and the arrow *b* represents the force tending to move the rim end 7 radially, the resultant force acting upon the end 7 of the rim will be represented by the arrow *c*. If the pins 15 are moved to such position that this resultant passes to the left of the pins 14, as shown in the diagram, the rim will be locked in collapsed condition, as will be understood. To expand the rim it is simply necessary to return the tool to its original position, which will re-aline the ends of the rim, as shown in Fig. 1. The cutting of the rim in a plane oblique to a radius, as shown, makes possible the telescoping of the ends of the rim by means of a tool of the form shown.

I claim—

1. A tool for operating a transversely split tire-carrying rim for vehicle wheels comprising two arms separated throughout the main portion of their length, but having end portions offset toward each other, a bolt for clamping said offset portions together, the opposite end portions of said arms being bent from the line of said tool, and a pair of pins projecting from the inside of each of said bent portions.

2. A tool for operating a transversely split tire carrying rim for vehicle wheels, comprising, in combination, two arms separated throughout the main portion of their length and having opposed end portions that are bent from the line of their main portions, a pair of pins projecting from the inner side of each said bent-end portion, said arms being relatively adjustable for attachment to and detachment from the ends of a transversely split rim, a clamping bolt for clamping said arms together for operation upon the rim, and the bends in said arm portions being such as to allow the main portions thereof to clear the inner side of the rim when in operating position as required to admit the hand of the operator.

RICHARD W. FUNK.

Witnesses:
LOUIS A. TRUSLOW,
GERALD E. TERWILLIGER.